3,359,313
NOVEL AMIDES OF β-KETO AMINES
Nelson R. Easton and Robert D. Dillard, Indianapolis, Ind., assignors to Eli Lilly and Company, Indianapolis, Ind., a corporation of Indiana
No Drawing. Filed June 3, 1965, Ser. No. 461,198
6 Claims. (Cl. 260—559)

This invention relates to certain novel amides of β-keto amines.

The compounds of this invention have utility in the treatment of crown gall, which is a manifestation in plants of the bacterial disease caused by the organism *Agrobacterium tumefaciens*. Crown gall is common to many nursery plants, in particular, roses, tomatoes, walnuts, apples, balsam, raspberries, and other plants of commercial importance. At the present time there are no commercial products useful against crown gall except the antibiotic streptomycin. The discovery of a simple, nontoxic, readily available compound useful against the disease, therefore, represents an important advancement in the art.

The compounds provided by the present invention can be represented by the following formula:

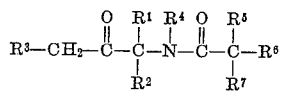

wherein $R^1$ and $R^2$, when taken alone, are lower alkyl, phenyl, or substituted phenyl containing no more than two substituents, the substituents being methyl, trifluoromethyl, or halo;

$R^1$ and $R^2$, when taken together with the carbon atom to which they are attached, complete a $C_5$–$C_8$ cycloalkyl ring;

$R^3$ is hydrogen, lower alkyl, halo, phenyl, or naphthyl;

$R^4$ is hydrogen, lower alkyl, $C_3$–$C_6$ cycloalkyl, lower-alkoxy-lower alkyl, or tetrahydrofurfuryl;

$R_5$ is phenoxy, mono- or di-substituted phenoxy, phenylthio, mono- or di-substituted phenylthio, naphthyloxy, mono- or di-substituted naphthyloxy, naphthylthio, or mono- or di-substituted naphthylthio; the substituents being methyl, trifluoromethyl, or halo; and $R_6$ and $R_7$ are hydrogen, methyl, or ethyl.

"Lower alkyl" as used herein, refers to methyl, ethyl, n-propyl, isopropyl, n-butyl, isobutyl, sec.-butyl, or tert.-butyl.

"Lower alkoxy" refers to the lower-alkyl groups above attached at any available position of the defined lower-alkyl group through an intervening oxygen atom. They may include illustratively methoxy, ethoxy, n-propoxy, isopropoxy, n-butoxy, isobutoxy, sec.-butoxy, tert.-butoxy.

"Halo" refers to fluoro, chloro, bromo, and iodo.

"$C_3$–$C_6$ cycloalkyl" refers to cyclopropyl, cyclobutyl, cyclopentyl, and cyclohexyl;

"$C_5$–$C_8$ cycloalkyl" refers to cyclopentyl, cyclohexyl, cycloheptyl, and cyclooctyl.

Representative compounds provided by this invention include:

3-methyl-3-phenoxyacetamide-2-heptanone
3-isopropyl-4-methyl-3-(p-chlorophenoxyacetamido)-2-pentanone
1-chloro-3-tert.-butyl-3-(m-trifluoromethylphenoxy-acetamido)-2-pentanone
3-ethyl-4,4-dimethyl-3-(2-fluorophenoxyacetamido)-2-pentanone
1-phenyl-3-(2-methoxyphenyl)-3-(3,4-diiodophenoxyacetamido)-2-pentanone
1-(1-naphthyl)-3-phenyl-3-(3-chloro-4-methylphenoxyacetamido)-2-pentanone
2-methyl-2-[3,4-bis(trifluoromethyl)phenoxyacetamido]-3-hexanone
3,6,8-trimethyl-6-phenoxyacetamido-5-nonanone
3-(4-tolyl)-3-(N-methyl-2-methyl-5-trifluoromethylphenoxyacetamido)-4-heptanone
1-phenyl-3-ethyl-3-(N-cyclohexyl-2-chlorophenoxyacetamido)-2-pentanone
1-(2-naphthyl-3-ethyl-3-(N-ethoxyethyl-3-methylphenoxyacetamido)-2-hexanone
3-sec.-butyl-3-[N-(2-tert.-butoxypropyl)-3-methylphenoxyacetamido]-2-hexanone
3-isobutyl-3-[N-(4-methoxybutyl)-3-bromophenylthioacetamido]-2-heptanone
3-(4-chlorophenyl)-3-[N-methyl-2-(4-bromophenoxy)propionamido]-2-butanone
3-(3-trifluoromethylphenyl)-3-[N-methoxyethyl-2-(3-iodophenylthio)butyramido]-2-pentanone
N-(1-acetylcyclohexyl)-N-methyl-2-ethyl-2-(4-fluorophenoxy)butyramide
N-(1-acetylcyclohexyl)-N-methyl-(2-ethyl-4-fluorophenoxy)butyramide
N-(1-acetylcyclopentyl)-N-(3-methoxy-2-butyl)-2[2,6-bis-(trifluoromethyl)-1-naphthyloxy]isobutyramide
N-(1-caproylcyclooctyl)-N-tetrahydrofurfuryl-2-ethyl-2-(3,4-dimethyl-2-naphthylthio)butyramide The compounds provided by this invention are prepared from the N-acylpropargylamines disclosed in our co-pending application submitted this even date by treatment with hydrogen chloride, and hydration of the resulting oxazolinium chloride. This method was discussed in detail by Easton and Dillard, J. Org. Chem., 28, 2465 (1963).

Alternatively, the compounds of the invention can be prepared in the following manner. The N-acylpropargylamine is dissolved in water or an aqueous organic solvent and a catalytic amount of a soluble salt of the metals silver, copper, or mercury in cationic form is added. Generally, an exothermic reaction ensues, quantitatively yielding the desired ketoamide; however in some cases the solution must be brought to an elevated temperature, as for example the reflux temperature of the solvent system employed, for several hours, in order to bring about complete reaction. The product can be isolated in pure form by precipitation of the metal salt catalyst as for example with sulfide ions, chloride ions, or hydroxyl ions, decantation or filtration, and evaporation of the solvent.

The compounds of the invention can also be prepared by acylation of the appropriate amino ketone [Easton et al., J. Org. Chem., 26, 3772 (1961)] with an acyl chloride, acyl azide, acyl anhydride, or the like.

The following examples are illustrative of the procedures available for their preparation and are not meant to limit the scope of the invention.

*Example 1*

A solution of 3 g. of silver nitrate in 10 ml. of water was added to a solution of 20 g. of N-(1-ethynylcyclohexyl)-p-chlorophenoxyacetamide in 500 ml. of ethanol at room temperature. The resulting mixture was refluxed for one hour, cooled, and 200 ml. of water and 200 ml. of saturated sodium chloride solution were added. The aqueous phase was decanted from the solid and extracted with 2× 200 ml. of chloroform. The chloroform solution was dried, filtered, and the volatile solvents removed in vacuo. The resulting residue was recrystallized from benzene-petroleum ether (boiling range: 60–90° C.), giving 16 g. of N - (1-acetylcyclohexyl)-p-chlorophenoxyacetamide. Melting point: 120–122° C.

*Analysis.*—Calcd. for $C_{16}H_{20}NO_3Cl$: C, 62.03; H, 6.50. Found: C, 61.61; H, 7.11.

In addition to the above compound, the following are several other examples of compounds prepared by the same procedure from appropriate starting materials:

3 - methyl - 3 - phenoxyacetamido-2-butanone, M.P. 95–97° C.

*Analysis.*—Calcd. for $C_{13}H_{17}NO_3$: C, 66.36; H, 7.28. Found: C, 66.58; H, 7.24.

3 - methyl-3-(N - methyl-4-chlorophenoxyacetamido)- 2-butanone, M.P. 124–126° C.

*Analysis.*—Calcd. for $C_{14}H_{18}ClNO_3$: C, 59.26; H, 6.39. Found: C, 59.33; H, 6.30.

3-methyl-3-(4-chlorophenoxyacetamido) - 2 - butanone, M.P. 105–107° C.

*Analysis.*—Calcd. for $C_{13}H_{16}ClNO_3$: C, 57.88; H, 5.97. Found: C, 58.04; H, 5.97.

N - (1-acetylcyclohexyl) - phenoxyacetamide, M.P. 86–88° C.

*Analysis.*—Calcd. for $C_{16}H_{21}NO_3$: C, 69.79; H, 7.69. Found: C, 69.86; H, 7.81.

N - (1 - acetylcyclohexyl) - 3,4-dichlorophenoxyacetamide, M.P. 128–130° C.

*Analysis.*—Calcd. for $C_{16}H_{19}Cl_2NO_3$: C, 55.82; H, 5.56. Found: C, 56.19; H, 5.79.

N - (1 - acetylcyclohexyl)-N-methyl-4-chlorophenoxyacetamide, M.P. 73–75° C.

*Analysis.*—Calcd. for $C_{17}H_{22}ClNO_3$: C, 63.05; H, 6.84. Found: C, 63.29; H, 7.03.

3 - methyl - 3 - (4-chlorophenylthioacetamido)-2-butanone, M.P. 110–112° C.

*Analysis.*—Calcd. for $C_{13}H_{16}ClNO_2S$: C, 54.63; H, 5.64. Found: C, 54.72; H, 5.41.

3 - methyl - 3 - (4 - fluorophenoxyacetamido)-2-butanone, M.P. 78–80° C.

*Analysis.*—Calcd. for $C_{13}H_{16}FNO_3$: C, 61.65; H, 6.36. Found: C, 61.42; H, 6.46.

N - (1 - acetylcyclohexyl)-4-fluorophenoxyacetamide, M.P. 127–129° C.

*Analysis.*—Calcd. for $C_{16}H_{20}FNO_3$: C, 65.51; H, 6.87. Found: C, 65.28; H, 7.07.

3 - methyl-3-(3,4-dichlorophenoxyacetamido)-2-butanone, M.P. 117–119° C.

*Analysis.*—Calcd. for $C_{13}H_{15}Cl_2NO_3$: C, 51.33; H, 4.97. Found: C, 51.57; H, 5.12.

N-(1 - acetylcyclohexyl)-N-methyl - 3,4 - dichlorophenoxyacetamide, M.P. 94–96° C.

*Analysis.*—Calcd. for $C_{17}H_{21}Cl_2NO_3$: C, 56.99; H, 5.90. Found: C, 57.25; H, 6.19.

N-(1 - acetylcyclohexyl) - N - methyl - 2,4-dichlorophenoxyacetamide, M.P. 97–99° C.

*Analysis.*—Calcd. for $C_{17}H_{21}Cl_2NO_3$: C, 56.99; H, 5.90. Found: C, 56.91; H, 5.85.

3 - methyl - 3 - (N - methyl - 2,4 - dichlorophenoxyacetamido)-2-butanone, M.P. 116–118° C.

*Analysis.*—Calcd. for $C_{13}H_{15}Cl_2NO_3$: C, 51.32; H, 4.97. Found: C, 51.39; H, 5.11.

N-(1 - acetylcyclohexyl) - 4 - bromophenoxyacetamide, M.P. 118–120° C.

*Analysis.*—Calcd. for $C_{16}H_{20}BrNO_3$: C, 54.24; H, 5.69. Found: C, 54.53; H, 5.85.

3 - methyl - 3 - (4 - bromophenoxyacetamido)-2-butanone, M.P. 118–120° C.

*Analysis.*—Calcd. for $C_{13}H_{16}BrNO_3$: C, 49.69; H, 5.13. Found: C, 49.94; H, 5.31.

3 - methyl - 3 - (N - tetrahydrofurfuryl-4-chlorophenoxyacetamido)-2-butanone, M.P. 167–169° C.

*Analysis.*—Calcd. for $C_{18}H_{24}ClNO_4$: C, 61.09; H, 6.83. Found: C, 61.25; H, 6.93.

N - (1 - acetylcyclohexyl) - 2,4 - dichlorophenoxyacetamide, M.P. 105–107° C.

*Analysis.*—Calcd. for $C_{16}H_{19}Cl_2NO_3$: C, 55.82; H, 5.56. Found: C, 55.54; H, 5.67.

*Example 2*

Dry hydrogen chloride gas was bubbled into a solution of 15 g. of 4-methyl-4-(N-methyl-p-chlorophenoxyacetamido)-2-pentyne in 500 ml. of methyl ethyl ketone until the solution was strongly acidic to Congo red test paper. Twenty milliliters of water were added, and the resulting solution was stirred for one hour. The solvents were then removed in vacuo, and the residue was dissolved in water, basified with 5 N sodium hydroxide solution, and extracted with chloroform. The chloroform extract was dried, evaporated to dryness in vacuo, and the residue recrystallized from methylcyclohexane, giving 12 g. of 2-methyl-2-(N-methyl-p-chlorophenoxyacetamido)-3-pentanone. Melting point: 115–117° C.

*Analysis.*—Calcd. for $C_{15}H_{20}NO_3Cl$: C, 60.50; H, 6.76. Found: C, 60.65; H, 6.83.

In addition to the above compounds, the following are several other examples of compounds prepared by the same procedure from appropriate starting materials:

2 - methyl - 2 - (N - methyl-2,4-dichlorophenoxyacetamido)-3-pentanone, M.P. 112–114° C.

*Analysis.*—Calcd. for $C_{15}H_{19}Cl_2NO_3$: C, 54.22; H, 5.76. Found: C, 54.15; H, 5.95.

3 - methyl - 3 - (N - methyl-3,4-dichlorophenoxyacetamido)-2-butanone, M.P. 135–137° C.

*Analysis.*—Calcd. for $C_{14}H_{17}Cl_2NO_3$: C, 52.84; H, 5.38. Found: C, 52.99; H, 5.57.

*Example 3*

A solution of 23 g. of 3-methyl-3-methylamino-2-butanone in 40.4 g. of triethylamine and 500 ml. of chloroform was maintained in an ice bath at 0 to 5° C. and to it was added dropwise a solution of 23.9 g. of 2,4-dichlorophenoxyacetyl chloride in 500 ml. of chloroform. The mixture thus obtained was allowed to warm to room temperature and stirred overnight, then washed with 300 ml. of dilute sodium hydroxide (1 N), dried, filtered, and the solvent removed in vacuo. The residue was recrystallized from benzene-methylcyclohexane, giving 23 g. of 3-methyl-3-(N-methyl-2,4-dichlorophenoxyacetamido)-2-butanone. Melting point: 125–126° C.

*Analysis.*—Calcd. for $C_{14}H_{17}NO_3Cl_2$: C, 52.84; H, 5.38. Found: C, 52.41; H, 5.61.

In addition to the above compounds, the following compound was prepared by the same procedure from the appropriately substituted amino ketone.

3 - methyl - 3 - (N - methylphenoxyacetamido)-2-butanone, M.P. 99–101° C.

*Analysis.*—Calcd. for $C_{14}H_{19}NO_3$: C, 67.44; H, 7.68. Found: C, 67.66; H, 7.60.

The compounds of the present invention, when used to control crown gall, can be applied to the infected plant or they can be used prophylactically. For example, a suspension of the compound in water in a concentration of from about 2 parts per million to about 40 parts per million can be sprayed onto the ground at the base of the plant or onto the growing plant in an amount great enough to thoroughly drench the foliar parts of the plant and drip from the aforementioned foliar parts thereby soaking the earth surrounding the crown of the plant. Alternatively, the compound in an aqueous suspension or dry powder formulation at 2 to 40 parts per million can be used as a dip for the seedlings during transplanting operations.

We claim:

1. A compound of the formula, $$R^3-CH_2-\overset{O}{\overset{\|}{C}}-\overset{R^1}{\underset{R^2}{\overset{|}{C}}}-\overset{R^4}{\underset{}{\overset{|}{N}}}-\overset{O}{\overset{\|}{C}}-\overset{R^5}{\underset{R^7}{\overset{|}{C}}}-R^6$$

wherein $R^1$ and $R^2$, when taken alone, are members of the group consisting of lower alkyl, phenyl, and phenyl bearing not more than two substituents selected from the group consisting of methyl, trifluoromethyl, and halo;

$R^1$ and $R^2$, when taken together with the carbon atom to which they are attached, complete a $C_5$–$C_8$ cycloalkyl ring;

$R^3$ is a member of the group consisting of hydrogen, lower alkyl, halo, phenyl, and naphthyl;

$R^4$ is a member of the group consisting of hydrogen, lower alkyl, $C_3$–$C_6$ cycloalkyl, lower-alkoxy-lower alkyl, and tetrahydrofurfuryl;

$R^5$ is a member of the group consisting of phenoxy, mono- and di-substituted phenoxy, phenylthio, mono- and di-substituted phenylthio, naphthyloxy, mono- and di-substituted naphthyloxy, naphthylthio, mono- and di-substituted naphthylthio, the substituents being members of the group consisting of methyl, trifluoromethyl, and halo;

$R^6$ and $R^7$ are members of the group consisting of hydrogen, methyl, and ethyl.

2. 3 - methyl-3-(N - methyl - 4 - chlorophenoxyacetamido)-2-butanone.

3. N - (1 - acetylcyclohexyl) - 3,4-dichlorophenoxyacetamide.

4. 3 - methyl - 3 - (3,4 - dichlorophenoxyacetamido)-2-butanone.

5. N - (1 - acetylcyclohexyl) - 4 - bromophenoxyacetamide.

6. 3 - methyl - 3 - (4 - bromophenoxyacetamido)-2-butanone.

References Cited
FOREIGN PATENTS
832,289 4/1960 Great Britain.

JOHN D. RANDOLPH, *Primary Examiner.*

H. I. MOATZ, *Assistant Examiner.*